May 5, 1925.
A. MARKOWSKI
PLANT SUPPORT
Filed Aug. 24, 1923
1,536,679
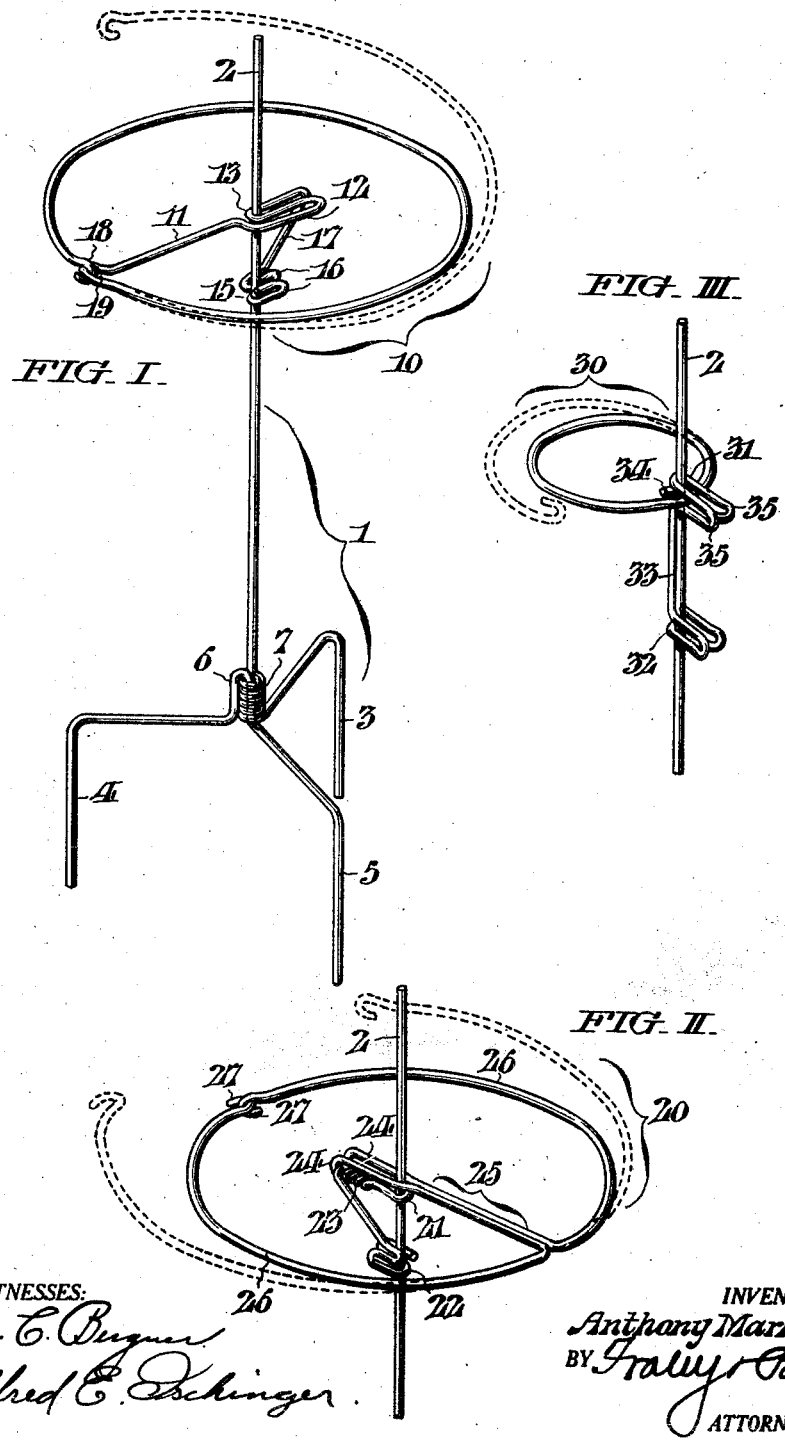

Patented May 5, 1925.

1,536,679

UNITED STATES PATENT OFFICE.

ANTHONY MARKOWSKI, OF CHESTNUT HILL, PENNSYLVANIA.

PLANT SUPPORT.

Application filed August 24, 1923. Serial No. 659,032.

*To all whom it may concern:*

Be it known that I, ANTHONY MARKOWSKI, a citizen of Soviet Russia, residing at Chestnut Hill, county of Montgomery, and State of Pennsylvania, have invented certain new and useful Improvements in Plant Supports, whereof the following is a specification, reference being had to the accompanying drawings.

My invention relates to devices useful in supporting plants, and is directed toward provision of simple means of this character capable of being readily and economically manufactured from wire with its parts relatively adjustable to facilitate application to plants of different sizes or as necessitated in the course of the growth of the plants, and so made as to be mutually detachable and collapsible for convenience of packing.

Other objects and attendant advantages of my invention will become readily apparent from the detailed description which follows of a typical embodiment thereof, and its scope is readily apparent from the appended claims.

In the drawings Fig. I is a perspective view of a plant support characteristic of my invention.

Figs. II and III are perspective illustrations of two alternative forms of plant engaging members which may be used in place of, or in conjunction with the one shown in the complete assembly of Fig. I.

As exemplified in Fig. I, a plant supporting device of my invention includes a standard 1, and one or more associated plant engaging members such as indicated at 10 adapted for adjustability vertically of said standard.

Confining attention for the time being to the standard 1, it will be seen that the same is made of comparatively stout wire, its main component affording a vertical mounting stem 2, and an integral offset leg 3 produced by angular bending of the wire. With this main component of the standard 1 is associated a supplemental piece appropriately bent to provide two additional offset legs 4—5 which are separated by an obtuse angle so as to form, in company with the leg 3, a tripod base for the stem 2. The legs 3, 4 and 5 when forced into the soil adjacent the plant to be supported, firmly hold the standard 1 in the desired set position. The parts of the standard 1 may be secured to each other in any approved way, preferably as herein shown with one side of a lateral retroverted bend 6 of the supplemental piece embraced in a coil 7 formed at the lower end of the stem 2 of the main component. This pivotal connection permits collapsing of the two parts of the standard for convenience in packing.

The plant engaging member 10 of Fig. I is wholly constructed of a single strand of springy wire fashioned to hoop or ring form as shown, and sustained from the stem 2 by an internal radial arm 11. This arm 11 extends inwardly somewhat beyond the hoop center, being retroverted at this region as indicated at 12 and then bent to provide an open elongated horizontal friction loop 13 which is appropriately constricted along its length for maintenance of the loop bight against dislodgment on the stem 2 although somewhat flared at its open end to ease entry of said stem in mounting. In order to prevent possible tilting of the hoop member 10 relative to the stem 2 and to assist in preventing accidental slippage thereof, along said stem, I provide at a point beyond the plane of the hoop, a second or auxiliary friction loop 15 which is formed at the inner terminus of the wire strand and like its companion is constricted for a purpose already understood. The frictional effect of the auxiliary loop 15 is enhanced through aid of elongated flanking retroversions 16 designed to engage opposite sides of the stem 2 and to extend somewhat therebeyond as shown. Although open and otherwise generally similar to the main friction loop 13 as well as being aligned therewith, the auxiliary loop 15 is somewhat smaller dimensioned as to length, and is joined with the former by an angularly disposed segment 17 of the wire strand. This construction it will be seen affords a projection which may be readily pressed by the thumb of one hand to dislodge the main friction loop 13 from the stem 2, whereupon the hoop member 10 may be readily wholly detached from said stem simply by pressure applied to a second projection jointly formed by the retroversions 16 of the auxiliary loop 15. Attachment of the hoop member 10 may obviously be quickly effected by a similar procedure in the reverse order. The outer end of the wire strand constituting the member 10 is made to fall at a point in the circumference of the hoop, and is formed into a hook 18 capable of being detachably engaged in an offset or recess 19 at the root of the radial arm 11; such engagement being maintained by virtue of the springiness of the hoop. By reason of the provisions just described, the hoop member 11 may be readily opened and will immediately thereupon automatically expand to the extent indicated by the dotted lines in Fig. I, thereby facilitating its application about the plant without necessitating removal from the mounting stem 2.

Fig. II shows a split or divided hoop member 20 which is generally similar to the member 10 aforedescribed except as to certain structural details. In this instance, the hoop proper and the main friction loop 21 only are made from a single piece of wire, the auxiliary friction loop 22 being separate and attached to its fellow by combined twisting and soldering as at 23. Another difference resides in the formation of the main friction loop 21 which here results from folding the strand of wire initially at the center, the double length obtaining by virtue of this procedure, being retroverted as at 24 to produce the radial arm 25. Beyond the friction loop 21, the parallel segments of the wire constituting the radial arm 25 are preferably brought into direct contact as shown, and if desired, soldered or otherwise secured together. The opposite extremities of the wire are bent to provide the companion arc complements 26—26 of the hoop and their ends are fashioned into hooks 27—27 designed to be detachably inter-engaged for a purpose analagous to that explained in connection with the hoop member 10. The advantage of the modified plant engaging member 20 over the first is that it may be applied somewhat more readily to the plant on account of the larger clearance afforded as a result of the centralized disposal of the radial arm 25 relative to the hoop segments 26—26.

The modified form of hoop member shown at 30 in Fig. III may be employed separately or in conjunction with either of the forms previously described, it being of smaller dimensions generally and designed to support the main stem or trunk of the plant while the others may be devoted to confining the branches. The member 30 is similar to the hoop member 10 in that it is constructed of a single strand of wire and formed with two friction loops 31, 32 these being however joined by a segment 33 of the wire which parallels the stem 2 when the member is in place so as to leave the interior of the loop clear of obstruction. Another slight difference will be noted in that the hoop closure in the instance under consideration is effected by engagement of the terminal hook 34 directly with the stem 2 in the horizontal interval between the side retroversions 35 of the main friction loop 31.

Having thus described my invention, I claim:

1. A plant support including a standard comprising a main component member of wire affording a single strand mounting stem with an integral offset leg, and a complementary member affording two additional offset legs to form a tripod base for the standard, in combination with a plant engaging member having integral bifurcate loops adapted to frictionally engage the stem of the standard.

2. A plant support including a standard comprising a main component member of wire affording a single strand mounting stem with an integral offset leg, and a complementary member having pivotal connection about the stem of the first and affording two additional offset legs to form a tripod base for the standard, in combination with a plant engaging member having parallel open-sided loops adapted to frictionally engage the stem of the standard.

3. A plant support comprising a single mounting stem having a tripod base, in combination with a plant engaging member of wire fashioned into the form of a hoop with internal bifurcated loops adapted to frictionally grip the mounting stem.

4. A plant support comprising a single mounting stem having a tripod base, in combination with a plant engaging member of wire fashioned into the form of a hoop with internal bifurcate gripping loops for sustaining the same concentrically of the mounting stem.

5. A plant support comprising a single mounting stem having a tripod base, in combination with a plant engaging member in the form of a hoop with an internal radial sustaining shank terminated with bifurcate grips adapted to frictionally engage the mounting stem.

6. A plant support comprising a single mounting stem having a tripod base, in combination with a plant engaging member constructed of a single strand of wire fashioned into the form of a hoop with internal open-sided loops for frictionally engaging the mounting stem.

7. A plant support comprising a single mounting stem with a tripod base, in combination with a plant engaging hoop member having superposed braced forked loops adapted to sustain the member on the mounting stem, said hoop being split to facilitate its application about the plant.

8. A plant support comprising a single mounting stem with a tripod base, in combination with a plant engaging member having integral spaced bifurcations adapted to frictionally grip the mounting stem, said member being in the form of a hoop of springy material split to facilitate its application about the plant.

9. A plant support comprising a single mounting stem with a tripod base, in combination with a plant engaging member in the form of a split hoop with integral major and minor bifurcate loops adapted to frictionally engage the mounting stem, said hoop being of springy material and provided at the split with interengaging means to normally hold the same closed.

10. A plant support comprising a single strand supporting stem with a tripod base, in combination with a plant engaging member constructed of a single strand of wire fashioned into the form of a hoop and affording open-sided loops for frictionally engaging the mounting stem, the ends of the wire being detachably connected at the circumference of the hoop.

11. A plant support comprising a single mounting stem with a tripod base; and a plant engaging member fashioned from wire into the form of a hoop with an internal radial sustaining arm, said arm having at its inner end a number of alignedly braced open-ended loops adapted to frictionally engage the mounting stem at and in different planes beyond the hoop.

12. A plant support comprising a single mounting stem with a tripod base; and a plant engaging member fashioned from wire into the form of a hoop with an internal radial sustaining arm, said arm having at its inner end a number of alignedly braced and relatively elongated open-ended loops adapted to frictionally engage the mounting stem in the plane of and in different planes beyond the hoop, and thumb projections at said loops whereby the latter may be individually detached from the mounting stem.

13. A plant support comprising a single mounting stem with a tripod base, in combination with a plant engaging member fashioned from wire into the form of a hoop with an internal radial sustaining arm, said arm having at its inner end in the plane of the hoop an elongated open-ended main friction loop for engaging the supporting stem, and in a plane beyond the hoop, an auxiliary friction loop open-ended like the first and bracedly aligned therewith, the sides of the two loops being retroverted to afford thumb projections whereby said loops may be individually detached from the mounting stem.

In testimony whereof, I have hereunto signed my name at Philadelphia, Pennsylvania, this 6th day of August, 1923.

ANTHONY MARKOWSKI.

Witnesses:
JAMES H. BELL,
LOUISE SCHLEPFER.